(12) United States Patent
Kurian et al.

(10) Patent No.: US 11,055,371 B2
(45) Date of Patent: Jul. 6, 2021

(54) USING SMART DATA FILTERS TO CREATE MULTI-THREADED PROFILES

(71) Applicant: Bank of America Corporation, Charlotte, NC (US)

(72) Inventors: Manu Kurian, Dallas, TX (US); Matthew Carroll, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 538 days.

(21) Appl. No.: 15/832,835

(22) Filed: Dec. 6, 2017

(65) Prior Publication Data
US 2019/0171769 A1 Jun. 6, 2019

(51) Int. Cl.
*G06F 16/00* (2019.01)
*G06F 16/9535* (2019.01)
*H04L 29/08* (2006.01)
*G06F 16/9038* (2019.01)

(52) U.S. Cl.
CPC ...... *G06F 16/9535* (2019.01); *G06F 16/9038* (2019.01); *H04L 67/306* (2013.01); *H04L 67/10* (2013.01)

(58) Field of Classification Search
CPC .......... G06F 16/24; G06F 16/90; G06F 16/95; G06F 16/2457; G06F 16/2458; G06F 16/9038; G06F 16/9535; G06F 16/9536
USPC ....................................................... 707/722
See application file for complete search history.

(56) References Cited

U.S. PATENT DOCUMENTS

| | | | |
|---|---|---|---|
| 9,665,885 B1* | 5/2017 | Allouche | G06Q 30/0244 |
| 9,996,981 B1* | 6/2018 | Tran | G06K 9/4671 |
| 10,026,129 B1* | 7/2018 | Ross | G06Q 40/08 |
| 10,037,420 B1* | 7/2018 | Ibrahim | G06Q 20/40145 |
| 10,043,160 B2* | 8/2018 | Murphy | G06Q 20/20 |
| 10,078,868 B1* | 9/2018 | Courbage | G06Q 40/025 |
| 10,394,885 B1* | 8/2019 | Paulus | G06Q 30/0271 |
| 10,564,849 B2* | 2/2020 | Lal | G06F 3/067 |
| 10,616,357 B2* | 4/2020 | Kurian | H04L 67/1014 |
| 10,803,514 B1* | 10/2020 | Campbell, III | G06Q 40/00 |
| 10,824,751 B1* | 11/2020 | Kurian | H04L 63/102 |
| 10,944,745 B2* | 3/2021 | Kursun | H04L 67/30 |
| 2007/0214272 A1* | 9/2007 | Isaacson | G06F 21/6209 709/229 |

(Continued)

*Primary Examiner* — Ashish Thomas
*Assistant Examiner* — Rezwanul Mahmood
(74) *Attorney, Agent, or Firm* — Banner & Witcoff, Ltd.; Michael A. Springs

(57) ABSTRACT

Aspects of the disclosure relate to using smart data filters to create multi-threaded profiles. A computing platform may generate a multi-threaded profile corresponding to a user. Thereafter, the computing platform may receive, via the communication interface and from a user device, external event information corresponding to the multi-threaded profile. Then, the computing platform may determine, based on the external event information, a filter bank corresponding to a first thread of the multi-threaded profile. Subsequently, the computing platform may determine, based on the external event information and the filter bank, a time to live parameter corresponding to the external event information. Next, the computing platform may retrieve, from a multi-threaded profile server and based on the multi-threaded profile and the filter bank, first thread information corresponding to the first thread of the multi-threaded profile.

21 Claims, 9 Drawing Sheets

(56) References Cited

U.S. PATENT DOCUMENTS

| | | | |
|---|---|---|---|
| 2011/0029521 A1* | 2/2011 | Thayne | G06F 16/90 707/737 |
| 2012/0005320 A1* | 1/2012 | Sheth | H04L 65/1046 709/222 |
| 2013/0268357 A1* | 10/2013 | Heath | G06Q 30/02 705/14.53 |
| 2014/0032259 A1* | 1/2014 | LaFever | G06Q 30/0271 705/7.29 |
| 2014/0040182 A1* | 2/2014 | Gilder | G06Q 40/12 707/602 |
| 2014/0129579 A1* | 5/2014 | Bramhall | G06F 16/24 707/758 |
| 2014/0244621 A1* | 8/2014 | Lindsay | G06F 16/335 707/722 |
| 2014/0280214 A1* | 9/2014 | Han | G06F 16/9535 707/748 |
| 2014/0365484 A1* | 12/2014 | Freeman | H04W 4/21 707/736 |
| 2015/0112815 A1* | 4/2015 | Tchakerian | G06Q 30/0269 705/14.66 |
| 2015/0112826 A1* | 4/2015 | Crutchfield, Jr. | G06Q 30/0643 705/26.1 |
| 2015/0254645 A1* | 9/2015 | Bondesen | G06Q 20/385 705/41 |
| 2015/0254653 A1* | 9/2015 | Bondesen | G06Q 20/385 705/41 |
| 2015/0254657 A1* | 9/2015 | Bondesen | G06Q 20/36 705/44 |
| 2015/0254658 A1* | 9/2015 | Bondesen | G06Q 20/385 705/44 |
| 2015/0254663 A1* | 9/2015 | Bondesen | G06Q 20/405 705/44 |
| 2015/0254664 A1* | 9/2015 | Bondesen | G06Q 20/3821 705/44 |
| 2015/0254698 A1* | 9/2015 | Bondesen | G06Q 20/20 705/14.17 |
| 2015/0254699 A1* | 9/2015 | Bondesen | G06Q 20/385 705/14.17 |
| 2015/0332264 A1* | 11/2015 | Bondesen | G06Q 20/385 705/44 |
| 2015/0379584 A1* | 12/2015 | Trachtenberg | G06Q 30/0275 705/14.71 |
| 2016/0019218 A1* | 1/2016 | Zhang | G06F 16/2457 707/727 |
| 2016/0063072 A1* | 3/2016 | N | G06F 3/0482 707/722 |
| 2016/0081575 A1* | 3/2016 | Wu | G16H 20/17 600/301 |
| 2016/0110810 A1* | 4/2016 | Ashok | G06F 16/9535 705/36 R |
| 2016/0148222 A1* | 5/2016 | Davar | G06Q 30/0201 705/7.32 |
| 2016/0364678 A1* | 12/2016 | Cao | G06Q 50/30 |
| 2017/0006135 A1* | 1/2017 | Siebel | G06N 5/003 |
| 2017/0039286 A1* | 2/2017 | Walke | G06F 16/254 |
| 2017/0098242 A1* | 4/2017 | Gould | G06Q 30/0282 |
| 2017/0193528 A1* | 7/2017 | Brown | G06F 16/2457 |
| 2017/0200240 A1 | 7/2017 | Marinelli et al. | |
| 2017/0201413 A1 | 7/2017 | Marinelli et al. | |
| 2017/0201424 A1 | 7/2017 | Doraiswamy et al. | |
| 2017/0201850 A1 | 7/2017 | Raleigh et al. | |
| 2017/0206545 A1 | 7/2017 | Gupta et al. | |
| 2017/0206890 A1 | 7/2017 | Tapuhi et al. | |
| 2017/0206891 A1 | 7/2017 | Lev-Tov et al. | |
| 2017/0208169 A1 | 7/2017 | Day, II et al. | |
| 2017/0209338 A1 | 7/2017 | Potucek et al. | |
| 2017/0209339 A1 | 7/2017 | Potucek et al. | |
| 2017/0209340 A1 | 7/2017 | Potucek et al. | |
| 2017/0209341 A1 | 7/2017 | Potucek et al. | |
| 2017/0211285 A1 | 7/2017 | Potucek et al. | |
| 2017/0212484 A1 | 7/2017 | Potucek et al. | |
| 2017/0212489 A1 | 7/2017 | Potucek et al. | |
| 2017/0212530 A1 | 7/2017 | Potucek et al. | |
| 2017/0212532 A1 | 7/2017 | Potucek et al. | |
| 2017/0212536 A1 | 7/2017 | Potucek et al. | |
| 2017/0213451 A1 | 7/2017 | Potucek et al. | |
| 2017/0215261 A1 | 7/2017 | Potucek et al. | |
| 2017/0220670 A1* | 8/2017 | Caldwell | G06F 16/287 |
| 2017/0236006 A1 | 8/2017 | Davis et al. | |
| 2017/0238055 A1 | 8/2017 | Chang | |
| 2017/0238056 A1 | 8/2017 | Greene et al. | |
| 2017/0251263 A1 | 8/2017 | Jaini et al. | |
| 2017/0255696 A1 | 9/2017 | Pulitzer | |
| 2017/0255826 A1 | 9/2017 | Chang et al. | |
| 2017/0255827 A1 | 9/2017 | Chang et al. | |
| 2017/0255828 A1 | 9/2017 | Chang et al. | |
| 2017/0255829 A1 | 9/2017 | Chang et al. | |
| 2017/0259120 A1 | 9/2017 | King et al. | |
| 2017/0259121 A1 | 9/2017 | King et al. | |
| 2017/0263147 A1 | 9/2017 | King et al. | |
| 2017/0270554 A1* | 9/2017 | Dandekar | H04W 4/02 |
| 2017/0270681 A1 | 9/2017 | Kirmani et al. | |
| 2017/0280068 A1 | 9/2017 | Shin et al. | |
| 2017/0283845 A1 | 10/2017 | Holmes et al. | |
| 2017/0286424 A1* | 10/2017 | Peterson | H04L 67/10 |
| 2017/0286425 A1* | 10/2017 | Peterson | H04L 67/306 |
| 2017/0286528 A1* | 10/2017 | Peterson | H04L 67/22 |
| 2017/0287475 A1 | 10/2017 | Baldwin | |
| 2017/0293610 A1* | 10/2017 | Tran | G06Q 10/025 |
| 2017/0301017 A1* | 10/2017 | Magdelinic | G06Q 40/04 |
| 2017/0310814 A1 | 10/2017 | Knight et al. | |
| 2017/0312614 A1* | 11/2017 | Tran | A61B 5/11 |
| 2017/0312746 A1 | 11/2017 | Holmes et al. | |
| 2017/0316487 A1 | 11/2017 | Mazed | |
| 2017/0316661 A1 | 11/2017 | Modi et al. | |
| 2017/0323325 A1 | 11/2017 | Hamedi | |
| 2017/0324624 A1 | 11/2017 | Taine et al. | |
| 2017/0324699 A1 | 11/2017 | Chakraborty et al. | |
| 2017/0324784 A1 | 11/2017 | Taine et al. | |
| 2017/0324785 A1 | 11/2017 | Taine et al. | |
| 2017/0324866 A1 | 11/2017 | Segre et al. | |
| 2017/0324867 A1 | 11/2017 | Tamblyn et al. | |
| 2017/0324868 A1 | 11/2017 | Tamblyn et al. | |
| 2017/0337912 A1 | 11/2017 | Caligor et al. | |
| 2017/0359718 A1* | 12/2017 | Denny | G06Q 30/0207 |
| 2018/0005271 A1* | 1/2018 | He | G06Q 50/01 |
| 2018/0025370 A1* | 1/2018 | Uttam | G06Q 30/0202 705/7.31 |
| 2018/0114154 A1* | 4/2018 | Bae | G06Q 30/0283 |
| 2018/0130010 A1* | 5/2018 | Kurian | G06F 16/9554 |
| 2018/0144378 A1* | 5/2018 | Perez | G06F 16/972 |
| 2018/0219917 A1* | 8/2018 | Chiang | G06F 21/45 |
| 2018/0232806 A1* | 8/2018 | Teng | G06N 7/02 |
| 2018/0278462 A1* | 9/2018 | Bjontegard | A63F 13/217 |
| 2018/0329940 A1* | 11/2018 | Tiku | G06F 16/21 |
| 2019/0026760 A1* | 1/2019 | Hwang | G06F 16/958 |
| 2019/0026830 A1* | 1/2019 | Powell | G06F 3/0485 |
| 2019/0147182 A1* | 5/2019 | Arora | G06F 16/00 726/28 |
| 2019/0171671 A1* | 6/2019 | Vierra | G06F 16/9035 |
| 2019/0171769 A1* | 6/2019 | Kurian | G06F 16/9038 |
| 2019/0172366 A1* | 6/2019 | Birt | G06Q 20/102 |
| 2019/0251593 A1* | 8/2019 | Allouche | G06Q 30/0269 |
| 2020/0020165 A1* | 1/2020 | Tran | G06N 7/005 |
| 2020/0117690 A1* | 4/2020 | Tran | G10L 15/26 |
| 2020/0160439 A1* | 5/2020 | Carroll | G06F 16/215 |
| 2021/0065294 A1* | 3/2021 | Trevathan | G06Q 50/01 |

\* cited by examiner

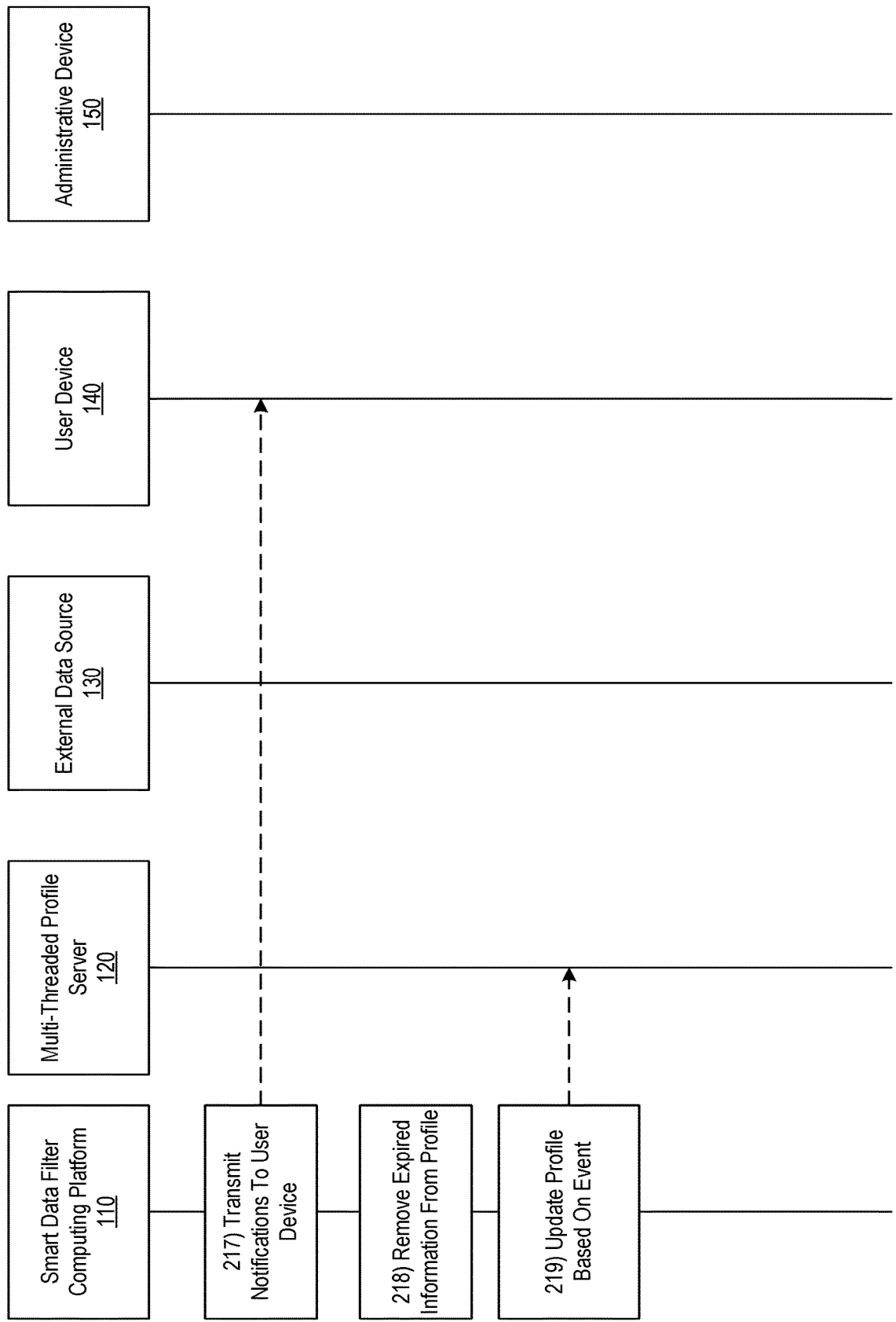

USING SMART DATA FILTERS TO CREATE MULTI-THREADED PROFILES

BACKGROUND

Aspects of the disclosure relate to data processing, data mining, filtering data, and extracting and removing of either wanted or unwanted data from a data source. In particular, one or more aspects of the disclosure relate to using smart data filters to create multi-threaded profiles.

In some instances, enterprise systems may receive event information associated with various users. As enterprise systems become more complex, however, the event information associated with the various users across an enterprise user base may increase exponentially. Therefore, it may be difficult for the system to efficiently and effectively filter and/or otherwise process events for the various users of the enterprise user base, particularly when also attempting to optimize for resource usage and network bandwidth consumption of the underlying computing infrastructure.

SUMMARY

Aspects of the disclosure provide effective, efficient, scalable, and convenient technical solutions that address and overcome the technical problems associated with filtering event data associated with smart data and multi-threaded profiles in an enterprise computing environment.

In accordance with one or more embodiments, a computing platform having at least one processor, a memory, and a communication interface may generate a multi-threaded profile corresponding to a user. Thereafter, the computing platform may receive, via the communication interface and from a user device, external event information corresponding to the multi-threaded profile. Then, the computing platform may determine, based on the external event information, a filter bank corresponding to a first thread of the multi-threaded profile. Subsequently, the computing platform may determine, based on the external event information and the filter bank, a time to live parameter corresponding to the external event information. Next, the computing platform may retrieve, from a multi-threaded profile server and based on the multi-threaded profile and the filter bank, first thread information corresponding to the first thread of the multi-threaded profile. Then, the computing platform may determine, based on the first thread information, the external event information, and the time to live parameter, one or more recommendations corresponding to the external event information. Also, the computing platform may generate one or more commands directing the user device to display the one or more recommendations corresponding to the external event information. Subsequently, the computing platform may transmit, via the communication interface and to the user device, the one or more commands.

In some embodiments, the computing platform may receive, via the communication interface and from an administrative device, new profile information corresponding to the multi-threaded profile. Then, the computing platform may generate, based on the new profile information, a plurality of threads for the multi-threaded profile, wherein each of the plurality of threads indicates previous interactions corresponding to the user. In some embodiments, the plurality of threads may comprise an education thread, a leisure thread, a hobby thread, or an exchange thread.

In some embodiments, the computing platform may receive, via the communication interface and from an external data source, customization information corresponding to the user. Subsequently, the computing platform may update, based on the customization information, the multi-threaded profile corresponding to the user. In some embodiments, the customization information may comprise social media information or professional worksite information corresponding to the user. In some embodiments, the first thread of the multi-threaded profile may comprise an education thread, a leisure thread, a hobby thread, or an exchange thread. In some embodiments, the determining the one or more recommendations may be based on comparing the first thread information with the external event information.

In some embodiments, in response to determining that the time to live parameter corresponding to the external event information has elapsed, the computing platform may remove the external event information from the multi-threaded profile. In some embodiments, the computing platform may update, based on the external event information, the first thread information corresponding to the first thread of the multi-threaded profile.

In some embodiments, the computing platform may receive, via the communication interface and from the user device, second external event information corresponding to the multi-threaded profile. Thereafter, the computing platform may determine, based on the second external event information, the filter bank corresponding to the first thread of the multi-threaded profile. Then, the computing platform may determine, based on the second external event information and the filter bank, a second time to live parameter corresponding to the second external event information. After, the computing platform may retrieve, from the multi-threaded profile server and based on the multi-threaded profile and the filter bank, the first thread information corresponding to the first thread of the multi-threaded profile, and the first thread information may include the external event information. Subsequently, the computing platform may determine, based on the first thread information, the second external event information, and the second time to live parameter, one or more second recommendations corresponding to the second external event information. Next, the computing platform may generate one or more second commands directing the user device to display the one or more second recommendations corresponding to the second external event information. Then, the computing platform may transmit, via the communication interface and to the user device, the one or more second commands.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A, 2B, 2C, 2D, and 2E depict an illustrative event sequence for using smart data filters to create multi-threaded profiles in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
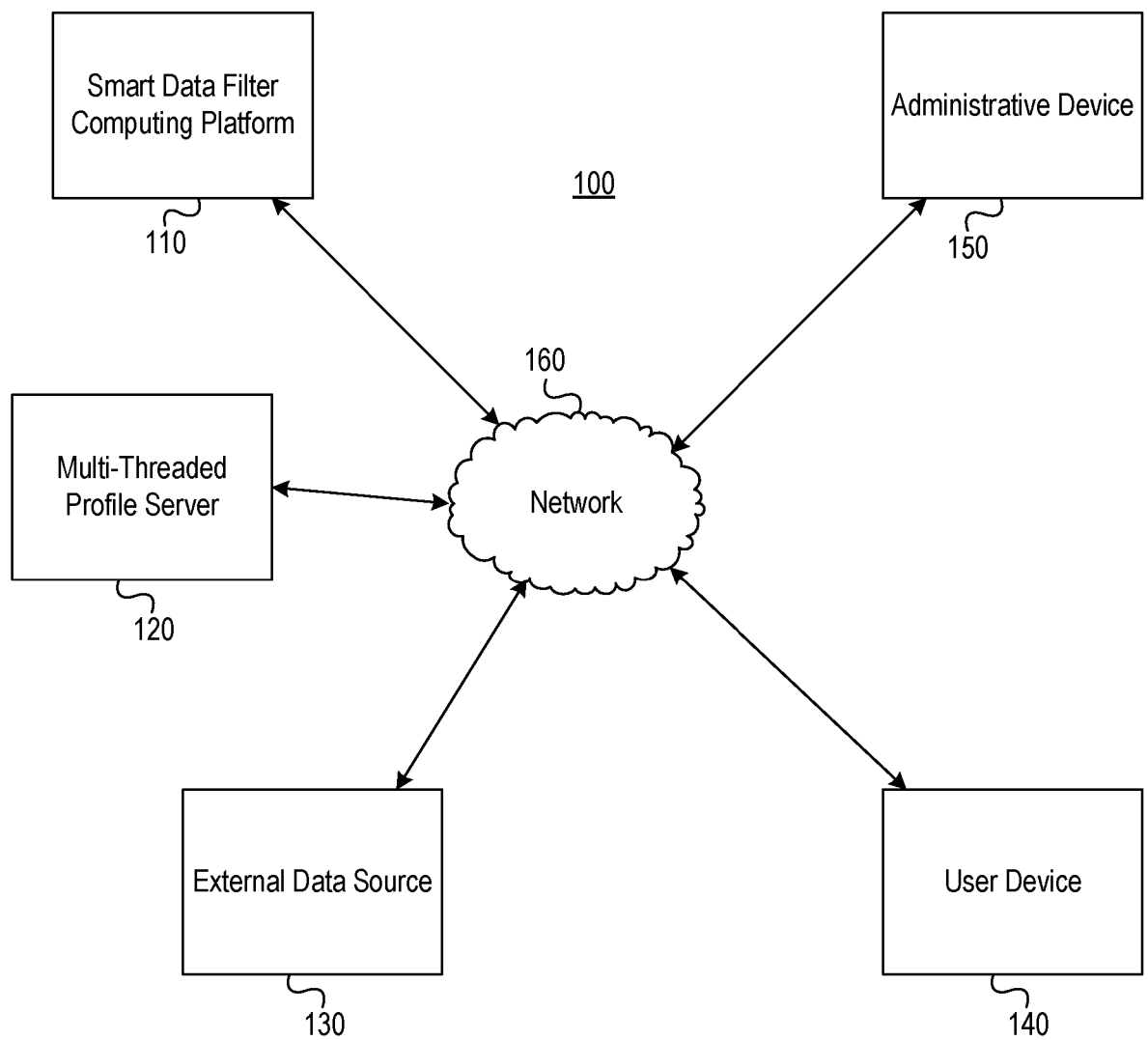
FIGS. 1A and 1B depict an illustrative computing environment for using smart data filters to create multi-threaded profiles in accordance with one or more example embodiments.
Figure 1B:
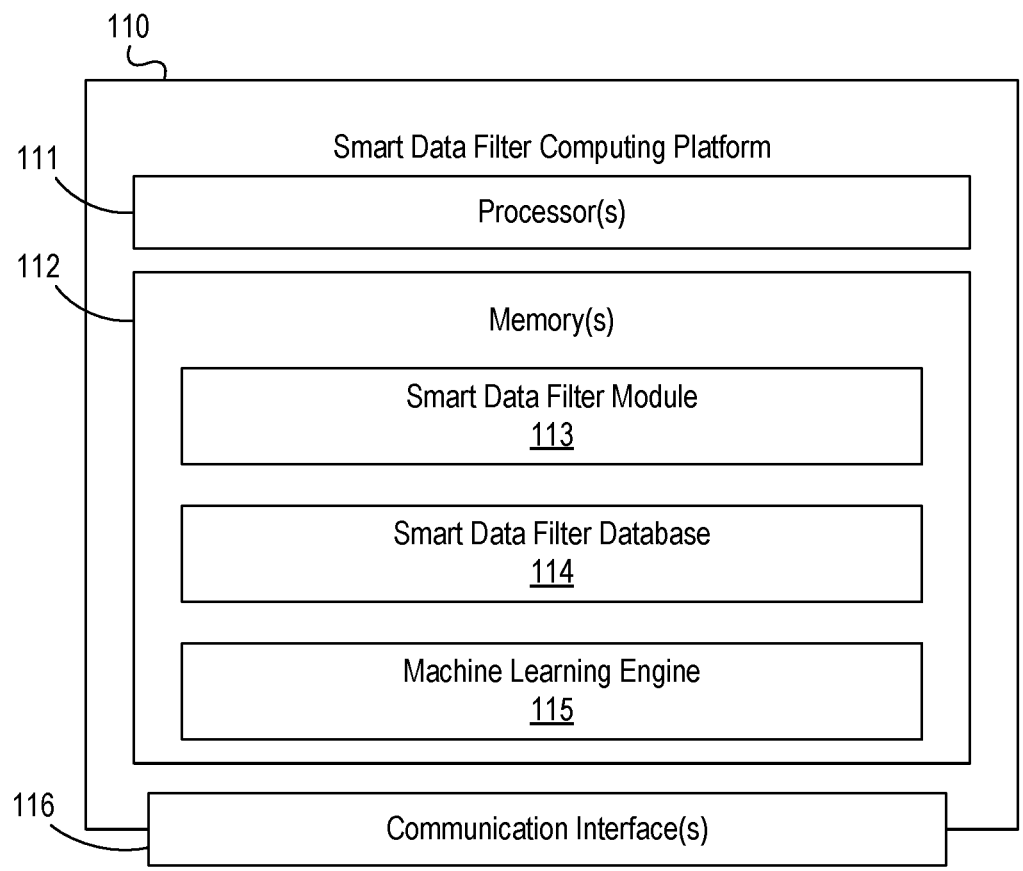

FIGS. 1A and 1B depict an illustrative computing environment for using smart data filters to create multi-threaded profiles in accordance with one or more example embodiments. Referring to FIG. 1A, computing environment 100 may include one or more computing devices and/or other computer systems. For example, computing environment 100 may include a smart data filter computing platform 110, a multi-threaded profile server 120, an external data source 130, a user device 140, and an administrative device 150.

Smart data filter computing platform 110 may be configured to use smart data filters to create multi-threaded profiles by controlling and/or directing actions of other devices and/or computer systems, and/or may be configured to perform other functions, as discussed in greater detail below. In some instances, the smart data filter computing platform 110 may perform and/or provide one or more techniques to use smart data filters to create multi-threaded profiles.

Multi-threaded profile server 120 may be configured to store, maintain, and/or analyze multi-threaded profiles for a plurality of different users. For example, the multi-threaded profile server 120 may be configured to store and/or maintain multi-threaded profiles for an enterprise organization. The multi-threaded profiles may be associated with a plurality of users, clients, and/or entities. For example, some multi-threaded profiles may be associated with users and/or clients using one or more services provided by an enterprise organization. Further, some multi-threaded profiles may be associated with entities using one or more services provided by the enterprise organization. In some instances, the multi-threaded profile server 120 might not be another computer system, but the functionalities of the multi-threaded profile server 120 may be included within the smart data filter computing platform 110.

External data source 130 may be a computing system configured to provide event data to the computing environment 100. For example, the external data source 130 may provide external profile information and/or external event information. In some instances, the external data source 130 may provide external profile information for one or more users. For instance, the external data source 130 may be a social media server. The social media server may provide social media information, such as information identifying a user's preferences, hobbies, leisure activities, and/or additional social media information, for one or more users. The external data source 130 may provide the social media information to the smart data filter computing platform 110. Additionally, and/or alternatively, the smart data filter computing platform 110 may create, customize, and/or update one or more multi-threaded profiles based on the social media information. In some examples, the external data source 130 may provide external event information corresponding to one or more users. For instance, the external event information may correspond to a user or customer of an organization, such as a financial institution. The external event information may indicate the purchasing of one or more items and/or other spending activities for the user. The smart data filter computing platform 110 may use the external event information to update the multi-threaded profiles. Additionally, and/or alternatively, in some embodiments, the smart data filter computing platform 110 may use the external event information to generate and/or otherwise determine one or more recommendations based on the spending activities for the user.

User device 140 may be configured to be used by one or more users of computing environment 100. For example, the user device 140 may be configured to display, present, and/or otherwise provide one or more user interfaces that enable users (who may, e.g., be customers of an organization, such as a financial institution) to provide external event information for a multi-threaded profile. For example, the user device 140 may receive, from the one or more users, user input or selections. Further, the user device 140 may send the user input or selections to the smart data filter computing platform 110 and/or one or more other computer systems and/or devices in computing environment 100. The user device 140 may receive, from the smart data filter computing platform 110 and/or one or more other computer systems and/or devices in computing environment 100, information or data in response to the user input or selection. In some instances, the user device 140 may receive notifications from the smart data filter computing platform 110 and/or one or more other computer systems and/or devices in computing environment 100. The notifications may indicate one or more recommendations that may be based on the external event information.

Administrative device 150 may be configured to be used by one or more users and/or administrators of computing environment 100. For example, the administrative device 150 may be configured to display, present, and/or otherwise provide one or more user interfaces that enable users (who may, e.g., be administrators of an organization) to provide new profile information corresponding to one or more users. For example, the administrative device 150 may receive, from the one or more users and/or administrators, user input or selections. Further, the administrative device 150 may send the user input or selections to the smart data filter computing platform 110 and/or one or more other computer systems and/or devices in computing environment 100. The administrative device 150 may receive, from the smart data filter computing platform 110 and/or one or more other computer systems and/or devices in computing environment 100, information or data in response to the user input or selection.

In one or more arrangements, the multi-threaded profile server 120, the external data source 130, the user device 140, and/or the administrative device 150 may be any type of computing device capable of providing a user interface, receiving input via the user interface, and communicating the received input to one or more other computing devices. For example, the multi-threaded profile server 120, the external data source 130, the user device 140, and/or the administrative device 150 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the multi-threaded profile server 120, the external data source 130, the user device 140, and/or the administrative device 150 may, in some instances, be special-purpose computing devices configured to perform specific functions.

Computing environment 100 also may include one or more computing platforms. For example, and as noted above, computing environment 100 may include the smart data filter computing platform 110. As illustrated in greater detail below, the smart data filter computing platform 110 may include one or more computing devices configured to perform one or more of the functions described herein. For example, the smart data filter computing platform 110 may include one or more computers (e.g., laptop computers, desktop computers, servers, server blades, or the like).

Computing environment 100 also may include one or more networks, which may interconnect one or more of the smart data filter computing platform 110, the multi-threaded profile server 120, the external data source 130, the user device 140, and/or the administrative device 150. For example, computing environment 100 may include network 160. Network 160 may include one or more sub-networks (e.g., local area networks (LANs), wide area networks (WANs), or the like). For example, network 160 may include a private sub-network that may be associated with a particular organization (e.g., a corporation, financial institution, educational institution, governmental institution, or the like) and that may interconnect one or more computing devices associated with the organization. For example, the smart data filter computing platform 110, the multi-threaded profile server 120, the external data source 130, the user device 140, and/or the administrative device 150 may be associated with an enterprise organization, and a private sub-network included in network 160 and associated with and/or operated by the organization may include one or more networks (e.g., LANs, WANs, virtual private networks (VPNs), or the like) that interconnect the smart data filter computing platform 110, the multi-threaded profile server 120, the external data source 130, the user device 140, and/or the administrative device 150. Network 160 also may include a public sub-network that may connect the private sub-network and/or one or more computing devices connected thereto (e.g., the smart data filter computing platform 110, the multi-threaded profile server 120, the external data source 130, the user device 140, and/or the administrative device 150) with one or more networks and/or computing devices that are not associated with the organization.

Referring to FIG. 1B, the smart data filter computing platform 110 may include one or more processors 111, memory 112, and communication interface 116. A data bus may interconnect processor(s) 111, memory 112, and communication interface 116. Communication interface 116 may be a network interface configured to support communication between the smart data filter computing platform 110 and one or more networks (e.g., network 160). Memory 112 may include one or more program modules having instructions that when executed by processor(s) 111 cause the smart data filter computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of the smart data filter computing platform 110 and/or by different computing devices that may form and/or otherwise make up the smart data filter computing platform 110. For example, memory 112 may have, store, and/or include a smart data filter module 113, a smart data filter database 114, and a machine learning engine 115. The smart data filter computing platform 110 may include instructions that direct and/or cause the smart data filter computing platform 110 to use smart data filters to create multi-threaded profiles, as discussed in greater detail below. The smart data filter database 114 may store information used by the smart data filter module 113 and/or the smart data filter computing platform 110 in using smart data filters to create multi-threaded profiles, and/or in performing other functions. Machine learning engine 115 may have instructions that direct and/or cause the smart data filter computing platform 110 to set, define, and/or iteratively redefine optimization rules, techniques and/or other parameters used by the smart data filter computing platform 110 and/or other systems in computing environment 100.

Figure 2A:
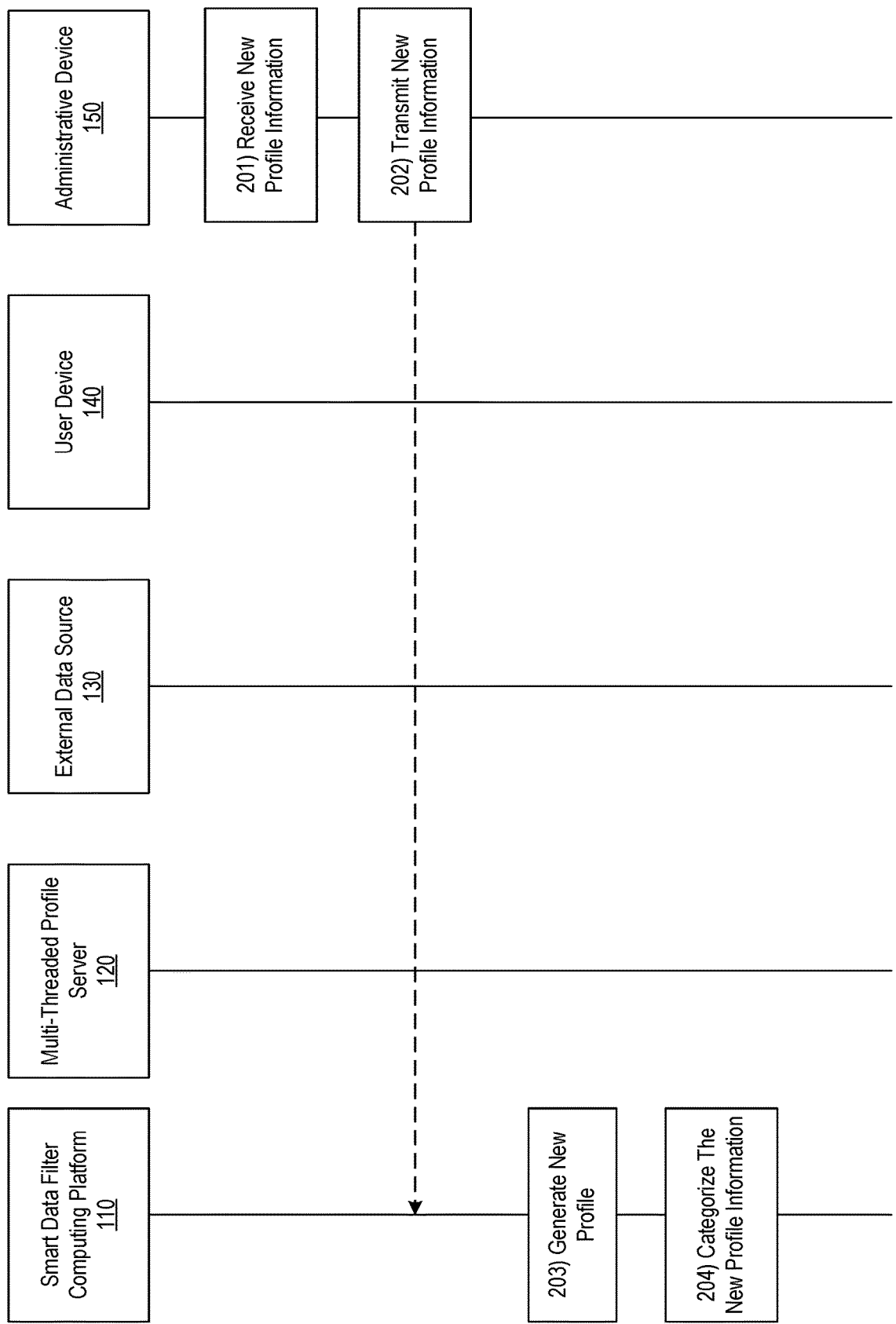

FIGS. 2A, 2B, 2C, 2D, and 2E depict an illustrative event sequence for using smart data filters to create multi-threaded profiles in accordance with one or more example embodiments. Referring to FIG. 2A, at step 201, the administrative device 150 may receive new profile information. For example, at step 201, the administrative device 150 may receive, from a user and/or administrator, user input indicating one or more commands to create a new profile for the user. For instance, the user may wish to create a profile and/or an account with an enterprise organization, such as a financial organization. After receiving the user input from the user and/or administrator, the administrative device 150 may process the user input to create the new profile. For example, the administrative device 150 may transmit the new profile information to the smart data filter computing platform 110. Then, the smart data filter computing platform 110 may use the new profile information to the create the new profile for the user.

Additionally, and/or alternatively, in some instances, the new profile information may comprise additional information corresponding to the user. For instance, the administrative device 150 may display prompts for the user to input additional information to be associated with the new profile and/or account. For example, the additional information may include spending information, education information, leisure information, and/or hobby information. After displaying the prompts, the administrative device 150 may receive user input for the additional information (e.g., spending information, education information, leisure information, and/or hobby information) for the profile and/or account.

In some examples, the spending information may indicate spending habits, previous purchases, financial goals, and/or other financial information indicated by the user. For example, the administrative device 150 may receive input indicating one or more financial goals, such as a retirement plan, a college fund, and/or a savings plan. For instance, the user may indicate that they would like to save money to purchase a new house or a new television.

In some embodiments, the education information may indicate education level and/or job information for the user. Additionally, and/or alternatively, the spending information and/or the education information may indicate personal and/or joint income for the user. In some instances, the leisure information may indicate leisure activities that the user enjoys in their free-time. For example, the administrative device 150 may receive input indicating the user enjoys hiking and/or traveling to tropical destinations. In some examples, the hobby information may indicate hobbies that the user enjoys. For example, the administrative device 150 may receive input indicating hobbies, such as playing video games or ice skating, for the user.

In some embodiments, rather than receiving new profile information corresponding a user, the new profile information may correspond to another enterprise organization, such as a corporation or a business organization. For example, a business organization may wish to create a profile and/or an account with the enterprise organization (e.g., the financial organization). The administrative device 150 may receive and/or process input to create a new profile for the business organization. Additionally, and/or alternatively, the administrative device 150 may receive additional information corresponding to the business organization. For example, the administrative device 150 may receive spending information (e.g., spending habits, purchases, sales, financial goals, and/or other financial information) for the business organization. For instance, the business organization may seek to determine a sufficient travel stipend for employees on business trips. The administrative device 150 may receive spending information corresponding to previous travel stipends and/or previous business trips. Then, in the steps below, the smart data filter computing platform 110 may calculate, monitor, and/or update the travel stipends for employees of the business organization.

At step 202, the administrative device 150 may transmit new profile information to the smart data filter computing platform 110. For example, after the administrative device 150 receives the new profile information at step 201, the administrative device 150 may transmit the new profile information to the smart data filter computing platform 110.

At step 203, the smart data filter computing platform 110 may generate a new profile. For example, based on the user input received at step 201, the smart data filter computing platform 110 may generate a new profile for the user and/or entity. The new profile may include a plurality of threads, such as an education thread, an exchange thread, a leisure thread, and/or a hobby thread. As described in more detail below, the smart data filter computing platform 110 may store and/or populate each of the plurality of threads with information corresponding to the user. Additionally, and/or alternatively, the smart data filter computing platform 110 may generate notifications and/or recommendations for the user based on the plurality of threads.

At step 204, the smart data filter computing platform 110 may categorize the new profile information. For example, based on the new profile information, the smart data filter computing platform 110 may categorize the new profile information for the new profile created at step 203. For instance, as mentioned previously, the new profile information may include additional information (e.g., spending information, education information, leisure information, and/or hobby information) for the profile and/or account. The smart data filter computing platform 110 may parse and categorize the additional information. Afterwards, the smart data filter computing platform 110 may categorize and store the additional information in the plurality of threads, such as the education thread, the exchange thread, the leisure thread, and/or the hobby thread, for the new profile.

In some instances, the smart data filter computing platform 110 may parse through the additional information to identify education information for the new profile. For example, the education information may indicate that the user is a recent college graduate and has a new job. Then, the smart data filter computing platform 110 may categorize and/or store the education information (e.g., the user is a recent college graduate and has a new job) in the education thread. Additionally, and/or alternatively, the smart data filter computing platform 110 may parse through the additional information to identify the spending information, the leisure information, and/or the hobby information. For example, the spending information may indicate that the user has a financial goal (e.g., a retirement plan) and/or is saving to purchase an item (e.g., a new television). Additionally, and/or alternatively, the leisure information may indicate the user enjoys taking vacations to tropical destinations. After parsing through the additional information, the smart data filter computing platform 110 may categorize and/or store the spending information in the exchange thread, the leisure information in the leisure thread, and/or the hobby information in the hobby thread.

Figure 2B:
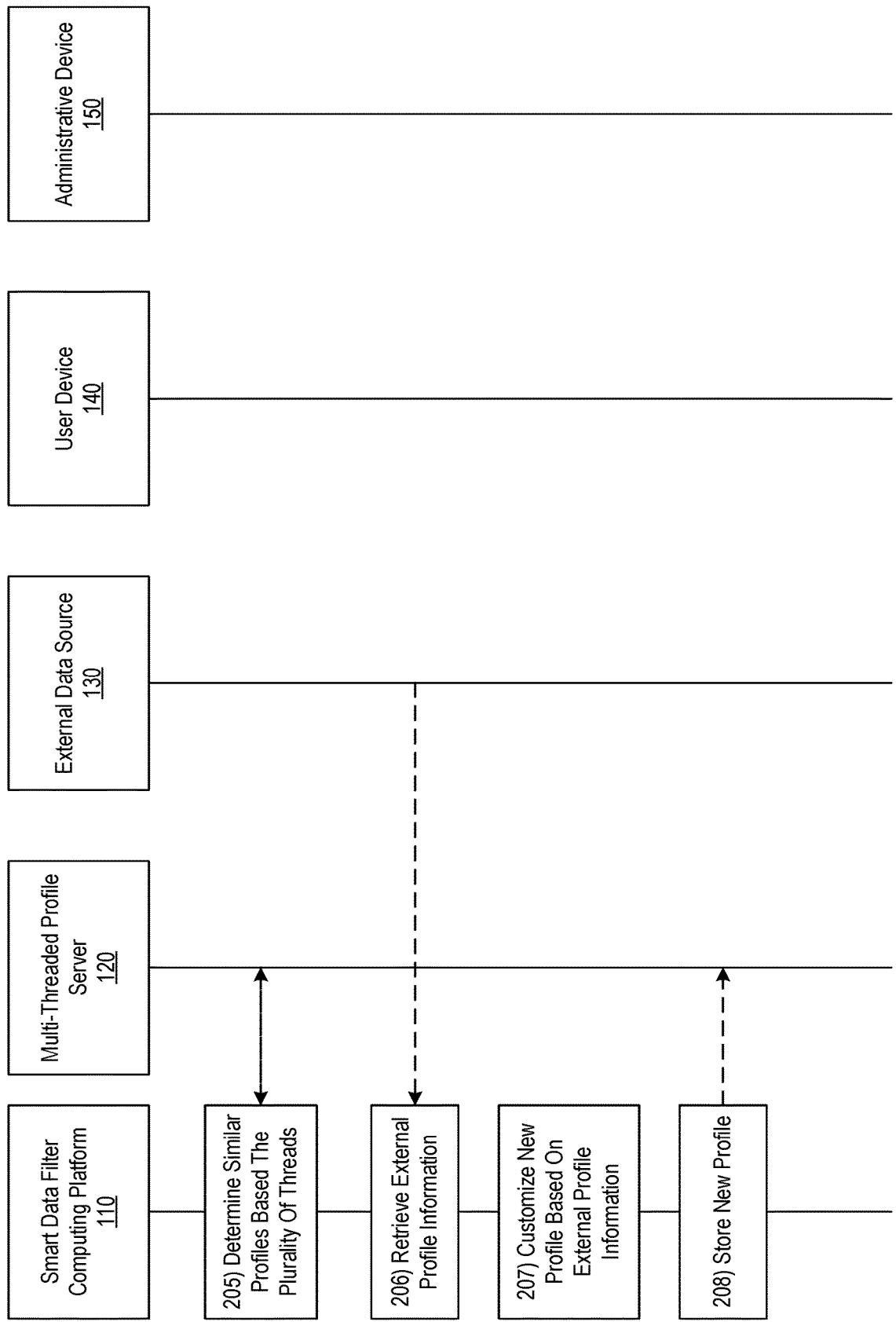

Referring to FIG. 2B, at step 205, the smart data filter computing platform 110 may determine similar profiles based on the plurality of threads. For example, after categorizing the new profile information into the plurality of threads, the smart data filter computing platform 110 may determine similar profiles to the new profile. Then, the smart data filter computing platform 110 may retrieve information from the similar profiles and store the information in threads of the new profile. As mentioned previously, the multi-threaded profile server 120 may store a plurality of multi-threaded profiles corresponding to a plurality of users and/or entities for the enterprise organization. Each of the plurality of multi-threaded profiles may include an education thread, an exchange thread, a leisure thread, and/or a hobby thread. Therefore, the smart data filter computing platform 110 may retrieve, from the multi-threaded profile server 120, information from one or more threads from one or more similar profiles. After retrieving the information, the smart data filter computing platform 110 may store the information into the associated thread for the new profile associated with the user.

In some examples, the smart data filter computing platform 110 may generate and/or transmit commands directing the multi-threaded profile server 120 to retrieve information from similar profiles to the new profile. In some embodiments, the multi-threaded profile server 120 may already store one or more multi-threaded profiles associated with the user and/or entity. Thus, the smart data filter computing platform 110 may retrieve information from the related profile (e.g., the multi-threaded profile already stored in the multi-threaded profile server 120) and store the information in the new profile.

In some instances, the smart data filter computing platform 110 may use one or more threads (e.g., the education thread, the exchange thread, the leisure thread, and/or the hobby thread) of the new profile to determine similar profiles. For example, the education thread of the new profile may indicate that the user is a recent college graduate. Thus, the smart data filter computing platform 110 may retrieve, from the multi-threaded profile server 120, information from profiles for other users that are recent college graduates. The retrieved information may include spending information (e.g., information from the exchange thread). For instance, the smart data filter computing platform 110 may retrieve previous purchases for other recent college graduates, and may then store the previous purchases in the exchange thread for the new profile.

Further, in some examples, the education thread of the new profile may indicate that the user has a master of business administration (MBA) degree. Additionally, the exchange thread of the new profile may indicate that the user has set up a retirement plan with the enterprise organization. Thus, the smart data filter computing platform 110 may retrieve, from the multi-threaded profile server 120, information from profiles for other users that have an MBA degree and have a similar retirement plan to the user. For instance, the smart data filter computing platform 110 may retrieve previous purchases for the similar profiles, and may then store the previous purchases in the exchange thread for the new profile.

In some embodiments, the education thread of the new profile may indicate that the user desires to become a full-time writer. Thus, the smart data filter computing platform 110 may retrieve, from the multi-threaded profile server 120, information from profiles for other users that are writers. Additionally, and/or alternatively, the smart data filter computing platform 110 may retrieve profiles for well-known or successful writers. Further, the smart data filter computing platform 110 may compare the threads for the retrieved profiles to determine similarities (e.g., spending activities, leisure activities, hobbies) that are common for well-known or successful writers. Based on the comparison, the smart data filter computing platform 110 may store the similarities in one or more threads of the new profile. For instance, some well-known writers may have similar leisure activities, such as going to coffee shops once a week to find inspiration for their work. The smart data filter computing platform 110 may determine the similarities (e.g., purchasing a coffee at a coffee shop each week) from the retrieved profiles. Then, the smart data filter computing platform 110 may store the leisure activity (e.g., going to coffee shops) in the leisure thread for the new profile.

At step 206, the smart data filter computing platform 110 may retrieve external profile information from the external data source 130. For example, the external data source 130 may be a social media provider. The smart data filter computing platform 110 may retrieve social media information for the user and/or entity. For instance, the smart data filter computing platform 110 may retrieve social information, such as hobbies, leisure activities, and/or items, for the user. For example, the smart data filter computing platform 110 may retrieve social media information, such as a brand of cars, that the user likes. Further, the smart data filter computing platform 110 may retrieve hobbies, such as hiking, or leisure activities, such as playing video games, that the user enjoys.

Additionally, and/or alternatively, the external data source 130 may be a professional worksite. The smart data filter computing platform 110 may retrieve, from the external data source 130, professional information for the user. For example, the smart data filter computing platform 110 may retrieve professional information, such as an occupation and/or an employer, associated with the user.

At step 207, the smart data filter computing platform 110 may customize the new profile based on the external profile information. For example, after retrieving the external profile information at step 206, the smart data filter computing platform 110 may customize the new profile. In some instances, the smart data filter computing platform 110 may parse through the external profile information and categorize the external profile information into the plurality of threads (e.g., an education thread, an exchange thread, a leisure thread, and/or a hobby thread). For instance, the social media information may indicate a brand of cars that the user likes. The smart data filter computing platform 110 may categorize and store the brand of cars that the user likes in the exchange thread. Further, the social media information may indicate hobbies, such as hiking, that the user enjoys. The smart data filter computing platform 110 may categorize and store the hiking hobby in the hobby thread. Additionally, and/or alternatively, the smart data filter computing platform 110 may categorize professional information, such as an occupation, and store the professional information in the exchange thread and/or the education thread.

At step 208, the smart data filter computing platform 110 may store the new profile in the multi-threaded profile server 120. For example, after generating the new profile, categorizing the new profile information into threads, and/or customizing the new profile based on the external profile information, the smart data filter computing platform 110 may store the new profile in the multi-threaded profile server 120. Thus, in some instances, based on the new profile information, the smart data filter computing platform 110 may generate a pre-built and/or standard profile for the user. For instance, the user may be a recent college graduate, and the smart data filter computing platform 110 may generate a standard recent college graduate profile using the new profile information. Then, after generating the standard profile, the smart data filter computing platform 110 may customize the standard profile for the user. For example, the smart data filter computing platform 110 may use the external profile information, such as social media information associated with the user, to customize the standard profile for the user. After generating and/or customizing the profile, the smart data filter computing platform 110 may store the multi-threaded profile in the multi-threaded profile server 120. As described below, the smart data filter computing platform 110 may update and/or optimize the multi-threaded profile based on events for the user. Further, the smart data filter computing platform 110 may use the multi-threaded profile to generate notifications and/or recommendations for the user.

In some examples, the smart data filter computing platform 110 may generate a plurality of multi-threaded profiles for a plurality of users and/or entities. After generating each of the plurality of multi-threaded profiles, the smart data filter computing platform 110 may store these profiles in the multi-threaded profile server 120. Then, as described below, the smart data filter computing platform 110 may use the multi-threaded profiles to determine recommendations for the user and/or the entity.

Figure 3:
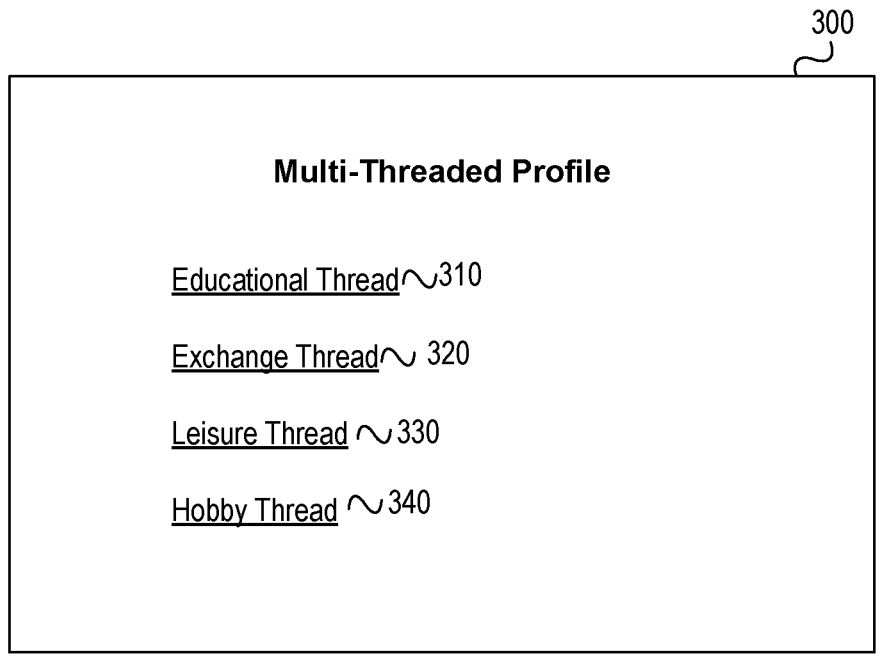
FIGS. 3 and 4 depict example graphical user interfaces for using smart data filters to create multi-threaded profiles in accordance with one or more example embodiments.

FIG. 3 depicts an example graphical user interface for an example multi-threaded profile corresponding to a user and/or an entity. As shown in FIG. 3, graphical user interface 300 may include one or more fields, controls, and/or other elements that may allow a user to view features of the multi-threaded profile for the user and/or entity. For example, the graphical user interface 300 may allow a user to view threads for the user profile, such as the "Educational Thread" 310, the "Exchange Thread" 320, the "Leisure Thread" 330, and/or "Hobby Thread" 330. The "Educational Thread" 310, the "Exchange Thread" 320, the "Leisure Thread" 330, and/or "Hobby Thread" 330 may be links. For instance, after receiving user input for one of the links, such as the "Exchange Thread" 320, the graphical user interface 300 may display exchange thread information for the user. For example, the graphical user interface 300 may display the new profile information, such as financial goals, retirement plans, and/or savings information for the user. Additionally, and/or alternatively, the graphical user interface 300 may display exchange thread information for other users with similar profiles, such as previous purchases that other users have made recently. Additionally, and/or alternatively, the graphical user interface 300 may display external profile information, such as a brand of cars that the user likes.

Figure 2C:
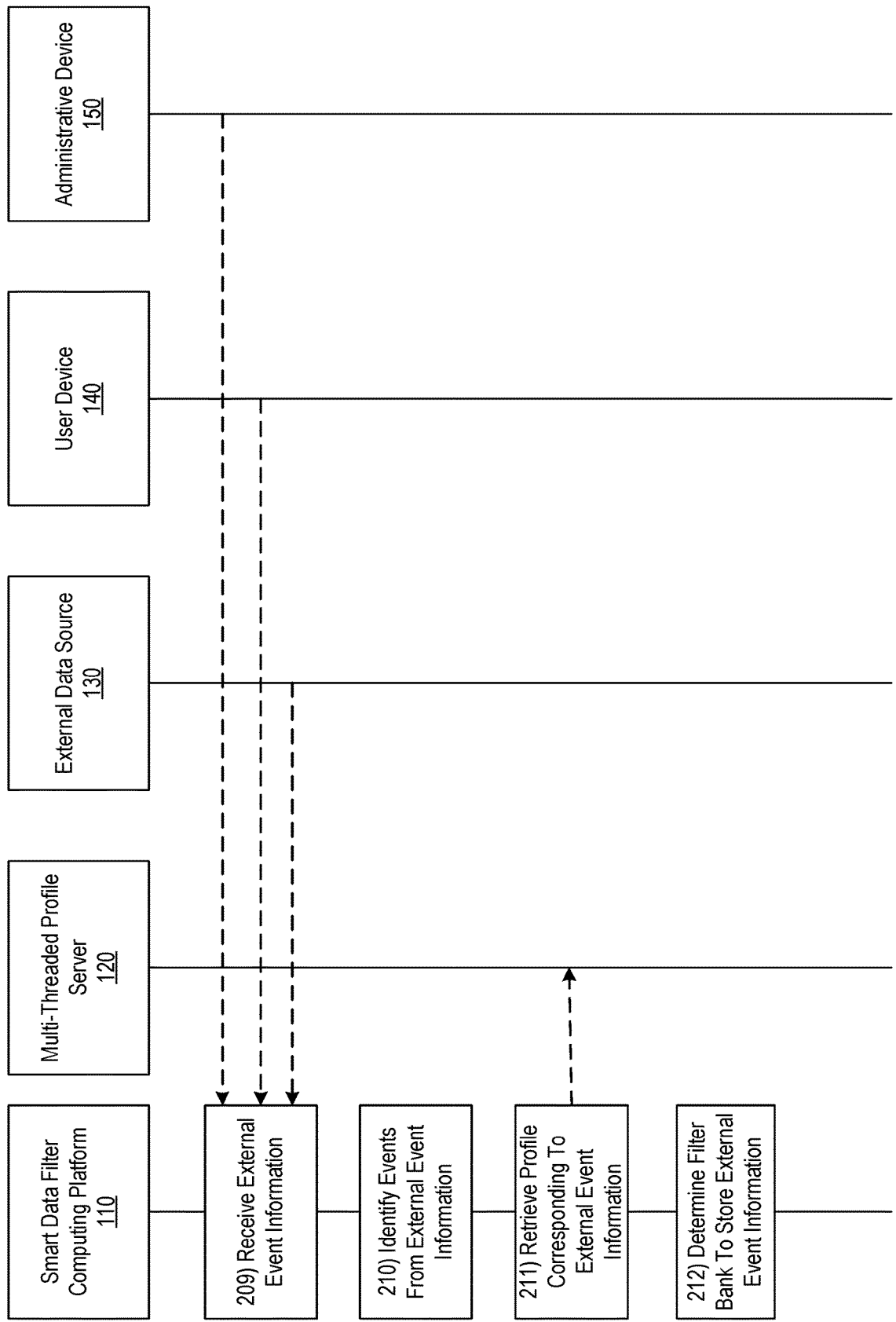

Referring to FIG. 2C, at step 209, the smart data filter computing platform 110 may receive external event information. For example, the smart data filter computing platform 110 may receive external event information from the external data source 130, the user device 140, and/or the administrative device 150. In some instances, the external event information may be big data corresponding to the enterprise organization. For example, the enterprise organization may pursue entrepreneurial endeavors by performing a plurality of services for a plurality of users and/or entities. The enterprise organization may use the external data source 130, the user device 140, and/or the administrative device 150 to perform the plurality of services.

In the course of performing the plurality of services, the enterprise organization may receive, monitor, track, analyze, process, and/or transmit a large amount of information, such as big data. For example, while performing services for the enterprise organization, the external data source 130, the user device 140, and/or the administrative device 150 may transmit information, such as external event information, to the smart data filter computing platform 110. The external event information may be big data (e.g., data sets that are voluminous and complex). Additionally, the enterprise organization may seek to identify important relationships within the big data sets. For example, based on the big data sets, the enterprise organization may seek to determine recommendations for a user, such as a client, of the enterprise organization. However, due to the complexity of the big data sets, it may be difficult for the enterprise organization to use the big data sets as is. Thus, prior to using the big data sets, the smart data filter computing platform 110 may filter the big data sets to generate smart data. For example, the smart data filter computing platform 110 may filter the big data sets to determine relevant data for a particular user and/or entity. Afterwards, the smart data filter computing platform 110 may be able to use the relevant, smart data to determine recommendations, such as item recommendations, for a particular user and/or entity.

At step 210, the smart data filter computing platform 110 may identify events from external event information. For example, as mentioned at step 209, the smart data filter computing platform 110 may receive big data, such as external event information. As the smart data filter computing platform 110 receives the external event information, the smart data filter computing platform 110 may also filter the external event information to generate smart data. For instance, many users may be purchasing items over a period of time, such as on Black Friday. Thus, on Black Friday, the smart data filter computing platform 110 may receive external event information indicating a plurality of purchases for the plurality of items by the plurality of users. As the smart data filter computing platform 110 receives the purchase information, the smart data filter computing platform 110 may also filter the external event information into manageable data sets, such as relevant and/or smart data sets. For instance, at step 210, the smart data filter computing platform 110 may identify events, such as individual events, from the external event information. In some examples, the individual events may be individual purchases and/or transactions for a user. For example, on Black Friday, a user may purchase a plurality of items, such as a television, a tablet, and a smartphone. The smart data filter computing platform 110 may filter the external event information to identify each purchase that the user made.

At step 211, the smart data filter computing platform 110 may retrieve a profile corresponding to the external event information. For example, after identifying events, such as individual events, from the external event information, the smart data filter computing platform 110 may retrieve a profile, such as a multi-threaded profile, for a user and/or entity corresponding to the event. In some instances, the smart data filter computing platform 110 may identify purchases made by a user on Black Friday. The smart data filter computing platform 110 may determine the user that made the purchases. Then, the smart data filter computing platform 110 may retrieve a multi-threaded profile, from the multi-threaded profile server 120, for the user.

At step 212, the smart data filter computing platform 110 may determine a filter bank to store the external event information. For example, after retrieving the profile at step 211, the smart data filter computing platform 110 may retrieve a multi-threaded profile corresponding to a user and/or entity. The smart data filter computing platform 110 may determine a filter bank, such as a thread of the multi-threaded profile, to store the event identified at step 210. In some examples, the smart data filter computing platform 110 may identify events, such as purchases (e.g., television, tablet, smartphone) that the user made on Black Friday. At step 212, the smart data filter computing platform 110 may determine a filter bank, such as an exchange bank corresponding to the exchange thread of the multi-threaded profile. Then, the smart data filter computing platform 110 may store the identified events in the corresponding thread. For instance, the smart data filter computing platform 110 may store the purchases (e.g., television, tablet, smartphone), in the exchange thread of the multi-threaded profile.

Figure 2D:
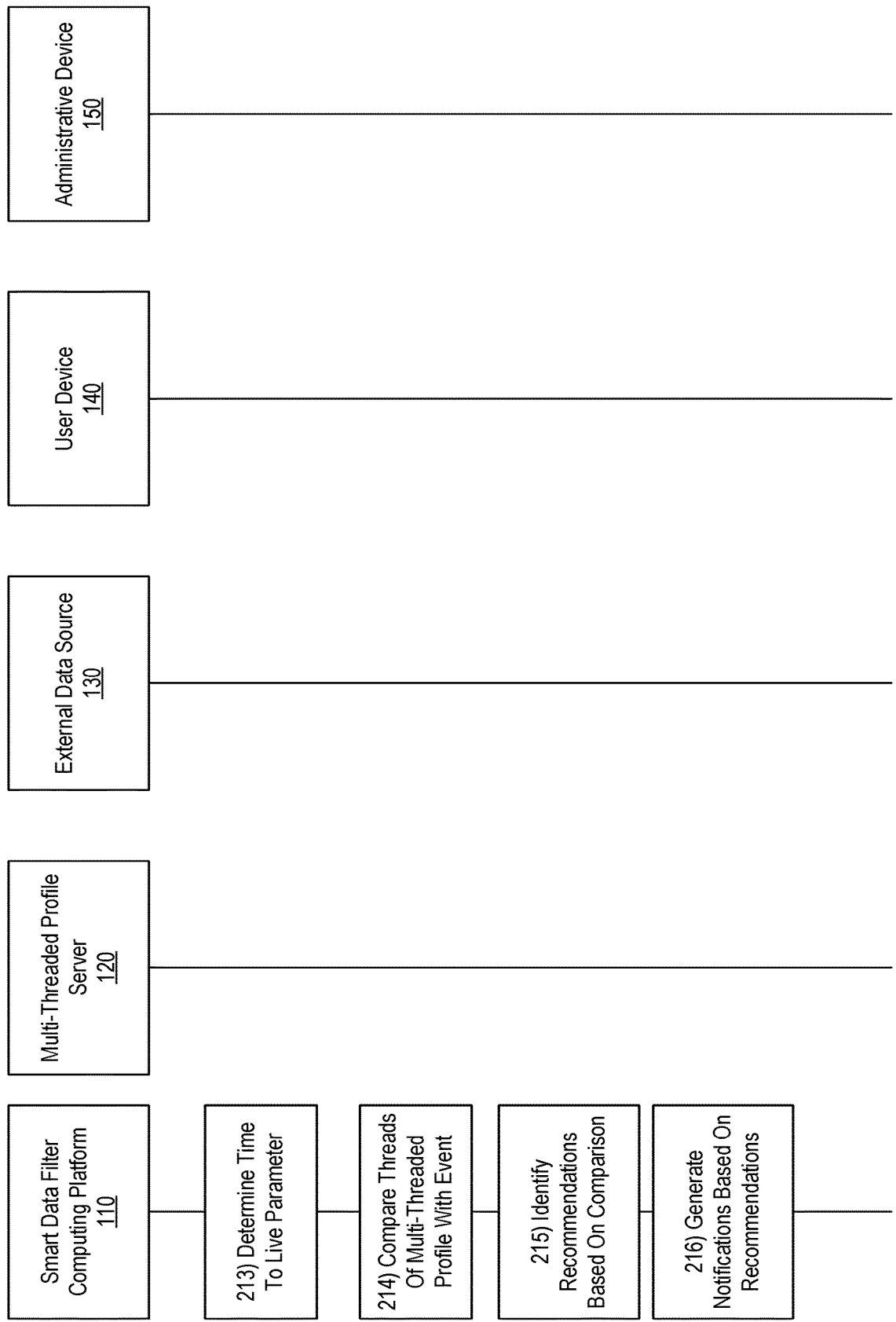

Referring to FIG. 2D, at step 213, the smart data filter computing platform 110 may determine a time to live parameter. For example, the smart data filter computing platform 110 may determine a time to live parameter for the event identified at step 210. The time to live parameter may be a time limit that the event remains relevant for the multi-threaded profile. After the time to live parameter elapses, the smart data filter computing platform 110 may remove the event from the thread. For example, the smart data filter computing platform 110 may determine an event, such as a purchase of a television, tablet, and smartphone, on Black Friday. The smart data filter computing platform 110 may determine a time to live parameter (e.g., a time limit) for the purchases. Additionally, and/or alternatively, the smart data filter computing platform 110 may determine different time to live parameters for the different items (e.g., a different time to live parameter for each of the television, tablet, and smartphone).

In some embodiments, the smart data filter computing platform 110 may determine the time to live parameter based on the filter banks. For example, each filter bank corresponding to a thread of the multi-threaded profile (e.g., the exchange thread, the education thread, the leisure thread, and/or the hobby thread) may have a different time to live parameter. For instance, the time to live parameter for the education thread (e.g., an MBA degree received by the user) may last much longer than the time to live parameter for the exchange thread (e.g., purchasing a smart phone). For example, the user may replace a smart phone every few years. However, the MBA degree may last forever. Thus, the time to live parameter for the education thread may last much longer than the time to live parameter for the exchange thread. In some examples, the time to live parameter for a hobby, such as hiking outdoors, may be longer than the time to live parameter for the education thread. For instance, the education thread may indicate the user's occupation. The user may decide to change occupations throughout their career. However, the user might always enjoy hiking outdoors. Thus, the time to live parameter for the hobby thread (e.g., hiking outdoors) may be longer than the time to live parameter for the education thread.

At step 214, the smart data filter computing platform 110 may compare threads of the multi-threaded profile with the event. As mentioned previously, the threads of the multi-threaded profile may include an education thread, an exchange thread, a hobby thread, and/or a leisure thread. The smart data filter computing platform 110 may compare the event identified at step 210 with the threads of the multi-threaded profile.

At step 215, the smart data filter computing platform 110 may identify recommendations based on the comparison. For example, based on the comparison between the threads of the multi-threaded profile with the event at step 214, the smart data filter computing platform 110 may identify recommendations. In some instances, the event may be a purchase of a television on Black Friday. The multi-threaded profile may indicate the user has a savings plan or a budget for a television for $500. However, the event may indicate that the user purchased the television for $600 on Black Friday. At step 214, the smart data filter computing platform 110 may compare the budget that the user indicated for the television for $500 in the exchange thread with the actual price of the television for $600. At step 215 and based on the user exceeding the budget, the smart data filter computing platform 110 may identify recommendations for the user. For instance, Black Friday might not be the best day to purchase a television. Based on the retrieved profiles for similar users from step 205, the smart data filter computing platform 110 may determine that television prices drop after the December holidays. Additionally, and/or alternatively, the smart data filter computing platform 110 may determine that after the December holidays, the television may drop below $500 (e.g., the budget set by the user). Thus, the smart data filter computing platform 110 identify one or more recommendations indicating that the user may return the already purchased television and re-purchase it after the December holidays.

In some examples, the event may indicate that the user purchased a new house. The multi-threaded profile may indicate that the user has recently graduated college. After comparing the education thread (e.g., recently graduated college) with the event (e.g., purchasing the new house), the smart data filter computing platform 110 may identify recommendations for the user, such as item recommendations for the new house. For instance, the smart data filter computing platform 110 may determine, from the exchange thread of the multi-threaded profile, a savings plan, budget, income, retirement goals, and/or other spending information for the user. Then, based on the exchange thread, the smart data filter computing platform 110 may identify item recommendations for the new house. For example, based on a savings plan and/or income of the user, the smart data filter computing platform 110 may identify washers, dryers, microwaves, refrigerators, and/or other items for the new house. Additionally, and/or alternatively, the smart data filter computing platform 110 may filter, based on the exchange thread, the items based on the savings plan, income, and/or other information from the exchange thread. Further, additionally, and/or alternatively, the smart data filter computing platform 110 may identify item recommendations based on the retrieved profiles for similar users from step 205. For example, the smart data filter computing platform 110 may identify item recommendations based on other users who have recently graduated college and have purchased a new house.

In some embodiments, the event may indicate that the user is seeking to purchase a new car. For example, the user device 140 may transmit external event information to the smart data filter computing platform 110 indicating that the user is seeking to purchase a new car. The multi-threaded profile may indicate that the user may like a brand of cars and may have previously purchased a car from the brand of cars. However, after comparing the multi-threaded profile with the event (e.g., seeking to purchase a new car), the smart data filter computing platform 110 may identify recommendations for the user, such as car recommendations for the user. For example, the smart data filter computing platform 110 may identify a car recommendation from the same brand of cars. Further, the smart data filter computing platform 110 may indicate a best time period (e.g., calendar month), to purchase the new car. Additionally, and/or alternatively, the smart data filter computing platform 110 may identify another car brand or another car that may be closer to the user's budget (e.g., determined from the exchange thread). For example, the user may seek to purchase a new car outside of the user's budget. The smart data filter computing platform 110 may determine recommendations that are similar to the new car desired by the user, but within the budget range of the user. Further, additionally, and/or alternatively, the user may have previously purchased cars from a particular brand. But, the smart data filter computing platform 110 may identify recommendations with similar car brands and/or types to the particular brand of cars that the user purchased previously.

In some instances, the event may indicate that the user is seeking to travel to a tropical destination. For example, the user device 140 may transmit external event information to the smart data filter computing platform 110 indicating that the user is seeking to travel to a tropical destination. The multi-threaded profile may indicate that the user frequently takes these beach trips (e.g., every year or every two years). The smart data filter computing platform 110 may identify recommendations (e.g., destination spots) for the user. Additionally, and/or alternatively, the smart data filter computing platform 110 may determine, from the exchange thread, spending information (e.g., budget information for the user) and may filter the recommendations based on the spending information.

In some examples, the multi-threaded profile may correspond to an entity, such as an enterprise organization. The event may indicate that the enterprise organization is sending one or more employees on a business trip. The smart data filter computing platform 110 may identify recommendations for the entity. For example, the smart data filter computing platform 110 may determine a stipend, such as a dinner and/or hotel budget, for the employees to use on the business trip. For instance, the smart data filter computing platform 110 may determine, from the exchange thread of the multi-threaded profile, previous dinner and/or hotel budgets that employees use for their business trip. Then, the smart data filter computing platform 110 may determine, based on the previous information (e.g., historical information) of the exchange thread, the stipend to be used by the employees on the business trip.

Additionally, and/or alternatively, the smart data filter computing platform 110 may determine other dates to send the employees on the business trip. For instance, the smart data filter computing platform 110 may determine a more cost-effective date to send employees on a business trip. For example, the smart data filter computing platform 110 may receive external event information indicating that the enterprise organization is sending employees on a business trip to New York for training purposes. However, the smart data filter computing platform 110 may determine that a music festival is occurring at the same time as the business trip, and hotel prices and/or airplane tickets may increase by 20% based on the music festival. Thus, the smart data filter computing platform 110 may determine a more cost-effective date, such as sending the employees on the business trip the week after the music festival, for the business trip.

At step 216, the smart data filter computing platform 110 may generate notifications based on the recommendations. For example, the smart data filter computing platform 110 may generate notifications based on the recommendations identified at step 215.

Referring to FIG. 2E, at step 217, the smart data filter computing platform 110 may transmit the notifications to the user device 140. For example, after generating the notifications at step 216, the smart data filter computing platform 110 may transmit the notifications to the user device 140.

Figure 4:
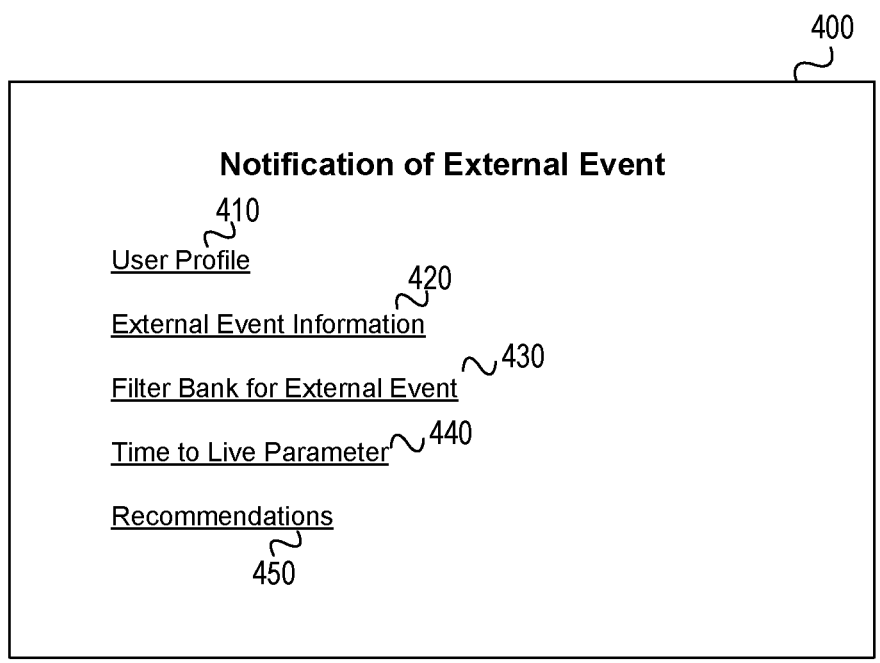

FIG. 4 depicts an example graphical user interface for a generated notification that may be transmitted to the user device 140. As shown in FIG. 4, graphical user interface 400 may include one or more fields, controls, links, and/or other elements that may allow a user to view notifications for the recommendations. For example, the graphical user interface 400 may allow a user to view the "User Profile" 410, the "External Event Information" 420, the "Filter Bank for External Event" 430, the "Time to Live Parameter" 440, and/or the "Recommendations" 450.

In some instances, the user device 140 may receive a user input for the "User Profile" 410 link. In response to the user input, the user device 140 may display a multi-threaded user profile, such as a multi-threaded user profile retrieved at step 211. In some examples, the user device 140 may receive a user input for the "External Event Information" 420 link. In response to the user input, the user device 140 may display an identified event, such as the events identified at step 210. In some embodiments, the user device 140 may receive a user input for the "Filter Bank for External Event" 430 link. In response to the user input, the user device 140 may display a filter bank to store the external event information, such as the filter bank determined at step 212. In some instances, the user device 140 may receive a user input for the "Time to Live Parameter" 440 link. In response to the user input, the user device 140 may display a time to live parameter, such as the time to live parameter determined at step 213. In some examples, the user device 140 may receive a user input for the "Recommendations" 450 link. In response to the user input, the user device 140 may display recommendations, such as recommendations identified at step 215.

At step 218, the smart data filter computing platform 110 may remove expired information from the multi-threaded profile. For example, as mentioned previously, the smart data filter computing platform 110 may determine time to live parameters for events. At step 218, the smart data filter computing platform 110 may determine whether any of the time to live parameters for the multi-threaded profile has elapsed. If a time to live parameter elapses, the smart data filter computing platform 110 may remove the corresponding event from the multi-threaded profile.

At step 219, the smart data filter computing platform 110 may update the multi-threaded profile based on the event. For example, as mentioned previously, the smart data filter computing platform 110 may store the identified event in one or more threads of the multi-threaded profile. Additionally, and/or alternatively, the smart data filter computing platform 110 may update the multi-threaded profile (e.g., the profile retrieved at step 211) with the recommendations identified at step 215. For instance, the smart data filter computing platform 110 may store the recommendations in one or more threads, such as the exchange thread, of the multi-threaded profile. After updating the multi-threaded profile based on the event, the smart data filter computing platform 110 may transmit the updated multi-threaded profile to the multi-threaded profile server 120.

In some embodiments, the smart data filter computing platform 110 may consistently and/or periodically filter the external event information. Further, the smart data filter computing platform 110 may also update and/or store identified events, recommendations, time to live parameters, and/or other information in the multi-threaded profile. For example, as the smart data filter computing platform 110 is receiving the external event information (e.g., big data), the smart data filter computing platform 110 may filter the external event information into one or more multi-threaded profiles. Then, the smart data filter computing platform 110 may use these updated multi-threaded profiles to determine recommendations and transmit notifications indicating the recommendations to the user device 140. Thus, the smart data filter computing platform 110 may filter the big data into smart data sets, and may use the smart data sets to determine recommendations for a particular user and/or entity.

Figure 5:
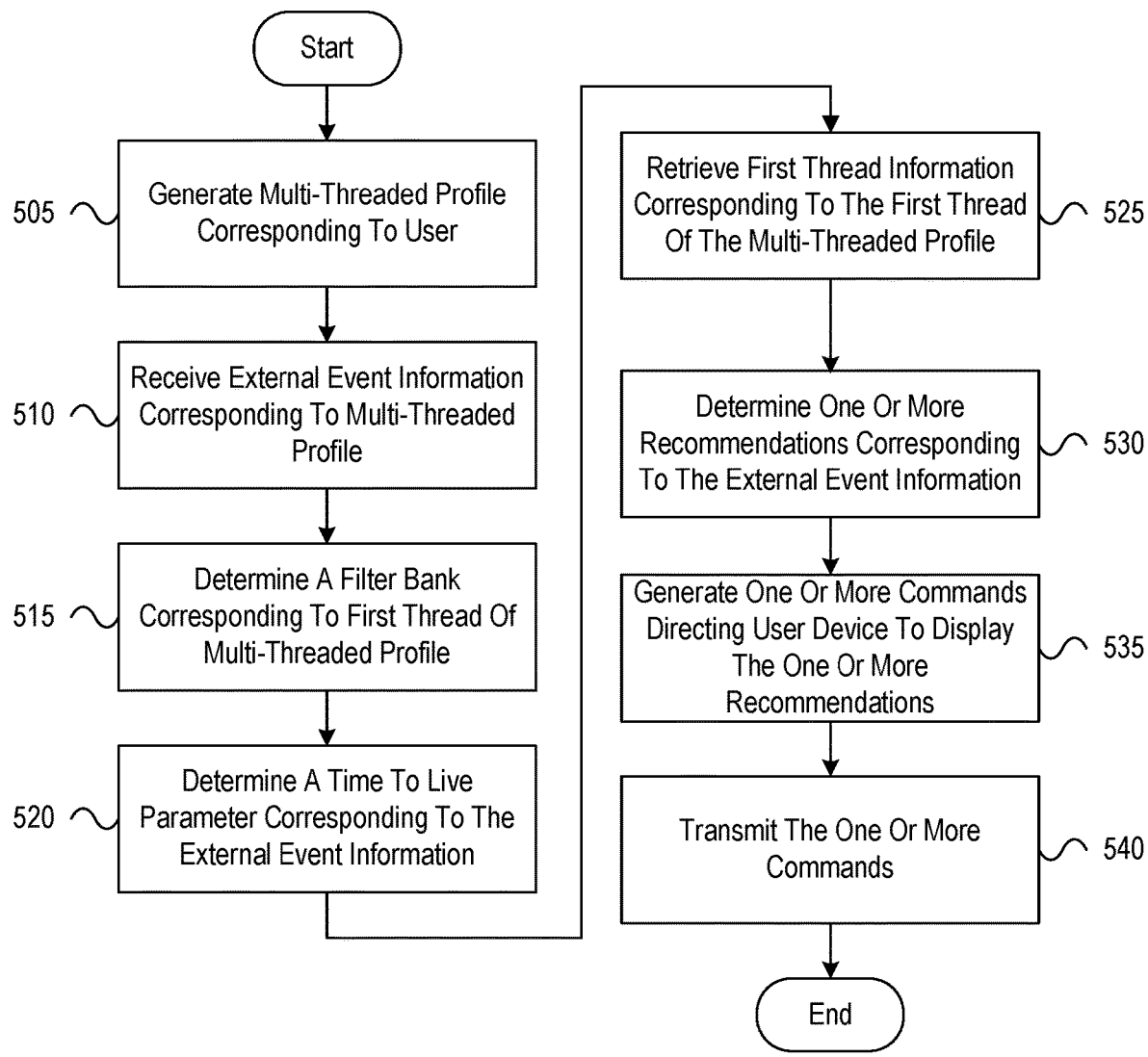
FIG. 5 depicts an illustrative method for using smart data filters to create multi-threaded profiles in accordance with one or more example embodiments.

FIG. 5 depicts an illustrative method for using smart data filters to create multi-threaded profiles in accordance with one or more example embodiments. Referring to FIG. 5, at step 505, a computing platform having at least one processor, a memory, and a communication interface may generate a multi-threaded profile corresponding to a user. At step 510, the computing platform may receive, via the communication interface and from a user device, external event information corresponding to the multi-threaded profile. At step 515, the computing platform may determine, based on the external event information, a filter bank corresponding to a first thread of the multi-threaded profile. At step 520, the computing platform may determine, based on the external event information and the filter bank, a time to live parameter corresponding to the external event information. At step 525, the computing platform may retrieve, from a multi-threaded profile server and based on the multi-threaded profile and the filter bank, first thread information corresponding to the first thread of the multi-threaded profile. At step 530, the computing platform may determine, based on the first thread information, the external event information, and the time to live parameter, one or more recommendations corresponding to the external event information. At step 535, the computing platform may generate one or more commands directing the user device to display the one or more recommendations corresponding to the external event information. At step 540, the computing platform may transmit, via the communication interface and to the user device, the one or more commands.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   generate, based on input received from a user corresponding to a financial organization, a multi-threaded profile corresponding to the financial organization, wherein the multi-threaded profile comprises financial information of the user;
   receive, via the communication interface and from a user device, external event information,
   wherein the external event information comprises a first big data set comprising additional financial information of the user;
   determine, based on the first big data set comprising additional financial information of the user, a first smart data set corresponding to the multi-threaded profile, wherein determining the first smart data set corresponding to the multi-threaded profile comprises determining the first smart data set corresponding to the multi-threaded profile based on the financial information of the user and a determination, by the computing platform, that the additional financial information of the user comprises at least one of information indicating user purchasing activity or information indicating user spending activity;
   determine, based on the first smart data set, a filter bank corresponding to an exchange thread of the multi-threaded profile;
   determine, based on the first smart data set and the filter bank corresponding to the exchange thread, a first time to live parameter corresponding to the first smart data set;
   retrieve, from a multi-threaded profile server configured to store multi-threaded profiles corresponding to the financial organization and based on the multi-threaded profile and the filter bank, exchange thread information corresponding to the exchange thread of the multi-threaded profile;
   determine, based on the exchange thread information, the first smart data set, and the first time to live parameter, one or more recommendations for the user;
   generate one or more commands directing the user device to display the one or more recommendations for the user;
   transmit, via the communication interface and to the user device, the one or more commands;
   determine that the first time to live parameter corresponding to the first smart data set has elapsed; and
   remove, based on the determining that the first time to live parameter has elapsed, the first smart data set from the multi-threaded profile.

2. The computing platform of claim 1, wherein the generating the multi-threaded profile corresponding to the user comprises:
   receiving, via the communication interface and from an administrative device, new profile information corresponding to the multi-threaded profile; and
   generating, based on the new profile information, a plurality of threads for the multi-threaded profile, wherein each of the plurality of threads indicates previous interactions corresponding to the user.

3. The computing platform of claim 2, wherein the plurality of threads comprises an education thread, a leisure thread, or a hobby thread.

4. The computing platform of claim 1, wherein the memory stores additional computer-readable instructions that, when executed by the at least one processor, further causes the computing platform to:
   receive, via the communication interface and from an external data source, customization information corresponding to the user; and update, based on the customization information, the multi-threaded profile corresponding to the user.

5. The computing platform of claim 4, wherein the customization information comprises social media information or professional worksite information corresponding to the user.

6. The computing platform of claim 1, wherein a second thread of the multi-threaded profile comprises an education thread, a leisure thread, or a hobby thread.

7. The computing platform of claim 1, wherein the determining the one or more recommendations is based on comparing the exchange thread information with the first smart data set.

8. The computing platform of claim 1, wherein the memory stores additional computer-readable instructions that, when executed by the at least one processor, further causes the computing platform to:
update, based on the first smart data set, the exchange thread information corresponding to the exchange thread of the multi-threaded profile.

9. The computing platform of claim 8, wherein the memory stores additional computer-readable instructions that, when executed by the at least one processor, further causes the computing platform to:
receive, via the communication interface and from the user device, second external event information,
wherein the second external event information comprises a second big data set corresponding to the financial organization;
determine, based on the second big data set corresponding to the financial organization, a second smart data set corresponding to the multi-threaded profile,
wherein determining the second smart data set corresponding to the multi-threaded profile comprises determining the second smart data set corresponding to the multi-threaded profile based on the financial information of the user and the second big data set comprising at least one of information indicating user purchasing activity or information indicating user spending activity;
determine, based on the second smart data set, the filter bank corresponding to the exchange thread of the multi-threaded profile;
determine, based on the second smart data set and the filter bank, a second time to live parameter corresponding to the second smart data set;
retrieve, from the multi-threaded profile server and based on the multi-threaded profile and the filter bank, exchange thread information corresponding to the exchange thread of the multi-threaded profile;
determine, based on the exchange thread information, the second smart data set, and the second time to live parameter, one or more second recommendations for the user;
generate one or more second commands directing the user device to display the one or more second recommendations corresponding to the second smart data set; and
transmit, via the communication interface and to the user device, the one or more second commands.

10. The computing platform of claim 1, wherein the financial information of the user is stored in the filter bank corresponding to the exchange thread.

11. The computing platform of claim 10, wherein the memory stores additional computer-readable instructions that, when executed by the at least one processor, cause the computing platform to:
generate one or more commands, based on receiving a request, from the user device, corresponding to the exchange thread, directing the user device to display the financial information of the user.

12. The computing platform of claim 10, wherein determining the one or more recommendations for the user comprises determining the one or more recommendations for the user further based on the user purchasing activity of the user, and wherein information corresponding to the user purchasing activity is stored in the filter bank corresponding to the exchange thread of the multi-threaded profile.

13. A method, comprising:
at a computing platform comprising at least one processor, memory, and a communication interface:
generating, based on input received from a business organization associated with a financial organization, a multi-threaded profile corresponding to the financial organization, wherein the multi-threaded profile comprises financial information of the business organization;
receiving, via the communication interface and from a computing device of the business organization, external event information,
wherein the external event information comprises a big data set comprising additional financial information of the business organization;
determine, based on the big data set comprising additional information of the business organization, a smart data set corresponding to the multi-threaded profile,
wherein determining the smart data set corresponding to the multi-threaded profile comprises determining the smart data set corresponding to the multi-threaded profile based on the financial information of the business organization and a determination, by the computing platform, that the additional financial information of the business organization comprises at least one of information indicating purchasing activity of the business organization or information indicating spending activity of the business organization;
determining, based on the smart data set, a filter bank corresponding to an exchange thread of the multi-threaded profile;
determining, based on the smart data set and the filter bank corresponding to the exchange thread, a time to live parameter corresponding to the smart data set;
retrieving, from a multi-threaded profile server configured to store multi-threaded profiles corresponding to the financial organization and based on the multi-threaded profile and the filter bank, exchange thread information corresponding to the exchange thread of the multi-threaded profile;
determining, based on the exchange thread information, the smart data set, and the time to live parameter, one or more recommendations for the business organization;
generating one or more commands directing the computing device of the business organization to display the one or more recommendations for the business organization;
transmitting, via the communication interface and to the computing device of the business organization, the one or more commands;
determining that the time to live parameter corresponding to the smart data set has elapsed; and removing, based on the determining that the time to live parameter has elapsed, the smart data set from the multi-threaded profile.

14. The method of claim 13, wherein the generating the multi-threaded profile corresponding to the business organization comprises:
receiving, via the communication interface and from an administrative device, new profile information corresponding to the multi-threaded profile; and
generating, based on the new profile information, a plurality of threads for the multi-threaded profile, wherein each of the plurality of threads indicates previous interactions corresponding to the business organization.

15. The method of claim 14, wherein the plurality of threads comprises an education thread, a leisure thread, or a hobby thread.

16. The method of claim 13, further comprising:
receiving, via the communication interface and from an external data source, customization information corresponding to the business organization; and
updating, based on the customization information, the multi-threaded profile corresponding to the business organization.

17. The method of claim 16, wherein the customization information comprises social media information or professional worksite information corresponding to the business organization.

18. The method of claim 13, wherein a second thread of the multi-threaded profile comprises an education thread, a leisure thread, or a hobby thread.

19. The method of claim 13, wherein the determining the one or more recommendations is based on comparing the exchange thread information with the smart data set.

20. The method of claim 13, further comprising:
updating, based on the smart data set, the exchange thread information corresponding to the exchange thread of the multi-threaded profile.

21. One or more non-transitory computer-readable media storing instructions that, when executed by a computing platform comprising at least one processor, memory, and a communication interface, cause the computing platform to:
generate, based on input received from a user corresponding to a financial organization, a multi-threaded profile corresponding to the financial organization, wherein the multi-threaded profile comprises financial information of the user;
receive, via the communication interface and from a user device, external event information,
wherein the external event information comprises a big data set comprising additional financial information of the user;
determine, based on the big data set comprising additional financial information of the user, a smart data set corresponding to the multi-threaded profile,
wherein determining the smart data set corresponding to the multi-threaded profile comprises determining the smart data set corresponding to the multi-threaded profile based on the financial information of the user and a determination, by the computing platform, that the additional financial information of the user comprises at least one of information indicating user purchasing activity or information indicating user spending activity;
determine, based on the smart data set, a filter bank corresponding to an exchange thread of the multi-threaded profile;
determine, based on the smart data set and the filter bank corresponding to the exchange thread, a time to live parameter corresponding to the smart data set;
retrieve, from a multi-threaded profile server configured to store multi-threaded profiles corresponding to the financial organization and based on the multi-threaded profile and the filter bank, exchange thread information corresponding to the exchange thread of the multi-threaded profile;
determine, based on the exchange thread information, the smart data set, and the time to live parameter, one or more recommendations for the user;
generate one or more commands directing the user device to display the one or more recommendations for the user;
transmit, via the communication interface and to the user device, the one or more commands;
determine that the time to live parameter corresponding to the smart data set has elapsed; and remove, based on the determining that the time to live parameter has elapsed, the smart data set from the multi-threaded profile.

* * * * *

UNITED STATES PATENT AND TRADEMARK OFFICE
CERTIFICATE OF CORRECTION

PATENT NO. : 11,055,371 B2
APPLICATION NO. : 15/832835
DATED : July 6, 2021
INVENTOR(S) : Kurian et al.

Page 1 of 1

It is certified that error appears in the above-identified patent and that said Letters Patent is hereby corrected as shown below:

In the Claims

Column 22, Claim 21, Line 41:
After "and", insert --¶--

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*